July 18, 1939. J. G. M. J. DE WOUTERS D'OPLINTER 2,166,241

DUAL CONTROL DEVICE FOR AIRCRAFT

Filed Feb. 5, 1938

INVENTOR
JEAN GUY MARIE JOSEF DE WOUTERS D'OPLINTER
By: Haseltine, Lake & Co.
ATTORNEYS Patented July 18, 1939

2,166,241

UNITED STATES PATENT OFFICE 2,166,241

DUAL CONTROL DEVICE FOR AIRCRAFT

Jean Guy Marie Josef de Wouters d'Oplinter, Brussels, Belgium

Application February 5, 1938, Serial No. 188,965
In Great Britain February 15, 1937

6 Claims. (Cl. 244—84)

My invention relates to dual control devices of aircraft, where two pilots seated upon two side-by-side seats are called upon to steer the machine alternately. The controls are operated both by the hands which operate a wheel, or its equivalent, and by the feet which operate a rudder bar, pedals or equivalent devices.

It is common practice to use only one handwheel mounted on a swivel arm which is pivoted on the top of a central control column; the handwheel may thus be swung over from one pilot to his mate. On the other hand, up to now the usual constructions have comprised two sets of feet-operated controls, one in front of each pilot. These twin sets have to be provided with some kind of inter-connecting device. This system has not only the drawback of its increased weight and complexity, but is a cause of danger, because a person sitting next to the pilot may interfere with the control of the aircraft.

According to my invention, only a single set of feet-operated controls is provided which are also laterally swingable for operation from either of two side-by-side seats. By eliminating the second set of feet-operated controls, the space in front of the person sitting next to the pilot becomes entirely free; this means complete safety, together with increased comfort.

The change-over is obtained automatically and instantaneously by simply swinging the hand-operated controls over. The connecting gear between the hand-operated controls and the feet-operated controls may be extremely simple and conveniently located under the floor of the cabin.

No locking device of the hand-control swivel arm needs to be provided, because it is held in position by the pressure of the feet resting on their controls.

A further advantage of having only one set of feet controls, which is shifted about a central point, is that the connections with the rudders, the brake differential, or other controls, may be effected from this central point—i. e., in the centre line of the aircraft. For this purpose, the said connections are simple—e. g., Bowden cables or the like—and are placed symmetrically of and close to the centre line of the aircraft or other machine.

Only one hole need be made in the floor of the cabin; it can be located in such a position that it is out of reach of the feet.

Figure 1:
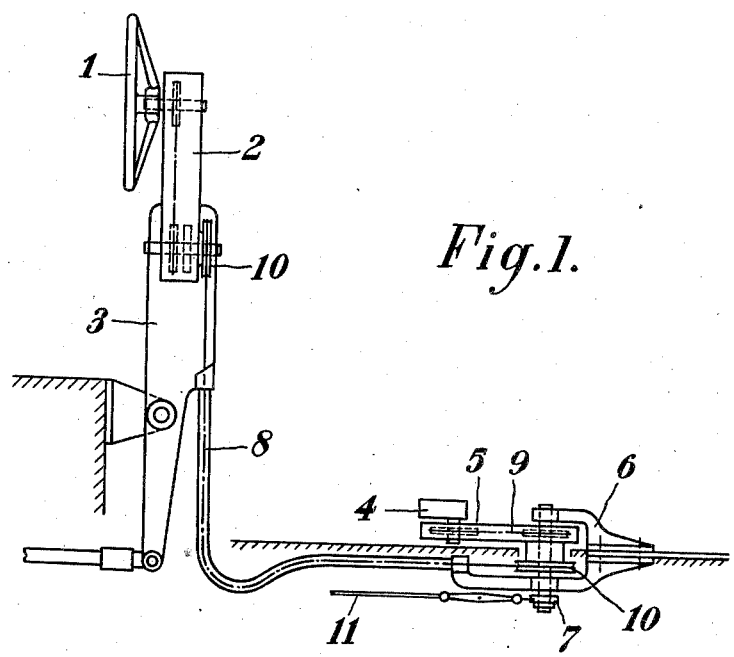
Figure 2:
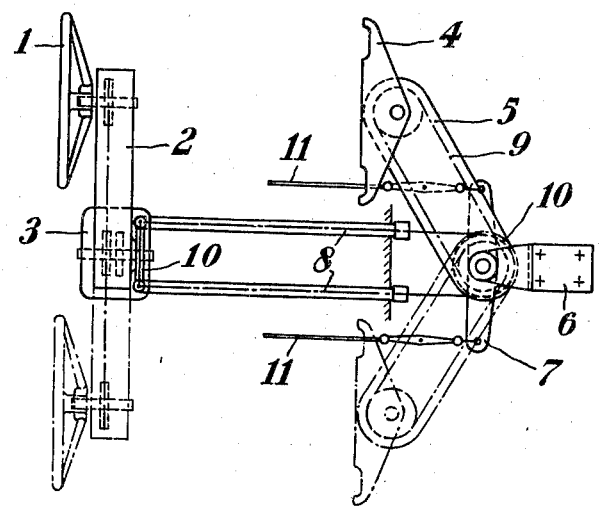

In the accompanying drawing, Figs. 1 and 2 illustrate, by an example, the working and constructive principles of the present invention, Fig. 1 being an elevation and Fig. 2 a plan.

The handwheel 1 is mounted on a swivel arm 2 which is pivoted on the top of a central control column 3. The single rudder bar 4 is also carried by a swivel arm 5 which is pivoted in a central bearing 6. The two swivel arms 2 and 5 are connected with each other by means of two Bowden cables 8 which actuate pulleys 10 that are fixed on the said swivel arms. The aileron control lower pulley is loosely mounted on the pivoted shaft carried by the arm 2 and upon which shaft is also carried one of the aforesaid pulleys 10.

The movements of the rudder bar 4 around its axle are transmitted to the central lever 7 by means of a chain 9. From this lever 7, connection is effected to the rudders by the cables 11 and, if required, also to the differential brake control.

The stops which limit the travel of the swivel arms 2 and 5 may easily be adjusted in order to suit the size of the pilots and the height of their adjustable seats. When a shorter pilot requires a higher seat, the handwheel is set higher and therefore the rudder bar comes nearer automatically.

What I claim is:

1. In a dual control for aircraft, a single set of hand-operated controls laterally swingable for operation from either of two side by side seats, a single set of foot-operated controls laterally swingable for operation from either of two side by side seats and means connecting said hand and foot-operated controls whereby the laterally swinging movement of the hand-operated control effects corresponding swinging movement of the foot-operated controls.

2. In a dual control for aircraft, a single set of hand-operated controls laterally swingable for operation from either of two side by side seats, a single set of foot-operated controls laterally swingable for operation from either of two side by side seats and means connecting said hand and foot-operated controls whereby the laterally swinging movement of the hand-operated control effects corresponding swinging movement of the foot-operated controls, said hand and foot-operated controls being restrained from laterally swinging movements during foot pressure on the foot-operated controls.

3. In a dual control for aircraft, a single set of hand-operated controls laterally swingable for operation from either of two side by side seats, a single set of foot-operated controls laterally swingable for operation from either of two side by side seats and means connecting said hand and foot-operated controls whereby the laterally swinging movement of the hand-operated control effects corresponding swinging movement of the foot-operated controls, said means including a pair of arms respectively pivotally supported at one end and a flexible drive connection between the pivoted ends of the arms for effecting swinging movement of the arm associated with the foot-operated controls upon swinging movement of the arm associated with the hand-operated controls.

4. In a dual control for aircraft, a single set of hand-operated controls laterally swingable for operation from either of two side by side seats, a single set of foot-operated controls laterally swingable for operation from either of two side by side seats and means connecting said hand and foot operated controls whereby the laterally swinging movement of the hand-operated control effects corresponding swinging movement of the foot-operated controls, said hand and foot-operated controls being restrained from laterally swinging movements during foot pressure on the foot-operated controls, said means including a pair of arms respectively pivotally supported at one end and a flexible drive connection between the pivoted ends of the arms for effecting swinging movement of the arm associated with the foot-operated controls upon swinging movement of the arm associated with the hand-operated controls.

5. In a dual control for aircraft, a single set of hand-operated controls laterally swingable for operation from either of two side by side seats, a single set of foot-operated controls laterally swingable for operation from either of two side by side seats and means connecting said hand and foot-operated controls whereby the laterally swinging movement of the hand-operated control effects corresponding swinging movement of the foot-operated controls, said means including a pair of arms respectively pivotally supported at one end, a pulley fixed to the pivoted end of each arm and an endless belt drive connection between the pulleys for effecting swinging movement of the arm associated with the foot-operated controls upon swinging movement of the arm associated with the hand-operated controls.

6. In a dual control for aircraft, a single set of hand-operated controls laterally swingable for operation from either of two side by side seats, a single set of foot-operated controls laterally swingable for operation from either of two side by side seats and means connecting said hand and foot-operated controls whereby the laterally swinging movement of the hand-operated control effects corresponding swinging movement of the foot-operated controls, said hand and foot-operated controls being restrained from laterally swinging movements during foot pressure on the foot-operated controls, said means including a pair of arms respectively pivotally supported at one end, a pulley fixed to the pivoted end of each arm and an endless belt drive connection between the pulleys for effecting swinging movement of the arm associated with the foot-operated controls upon swinging movement of the arm associated with the hand-operated controls.

JEAN GUY MARIE JOSEF
DE WOUTERS D'OPLINTER.